Patented Aug. 12, 1947

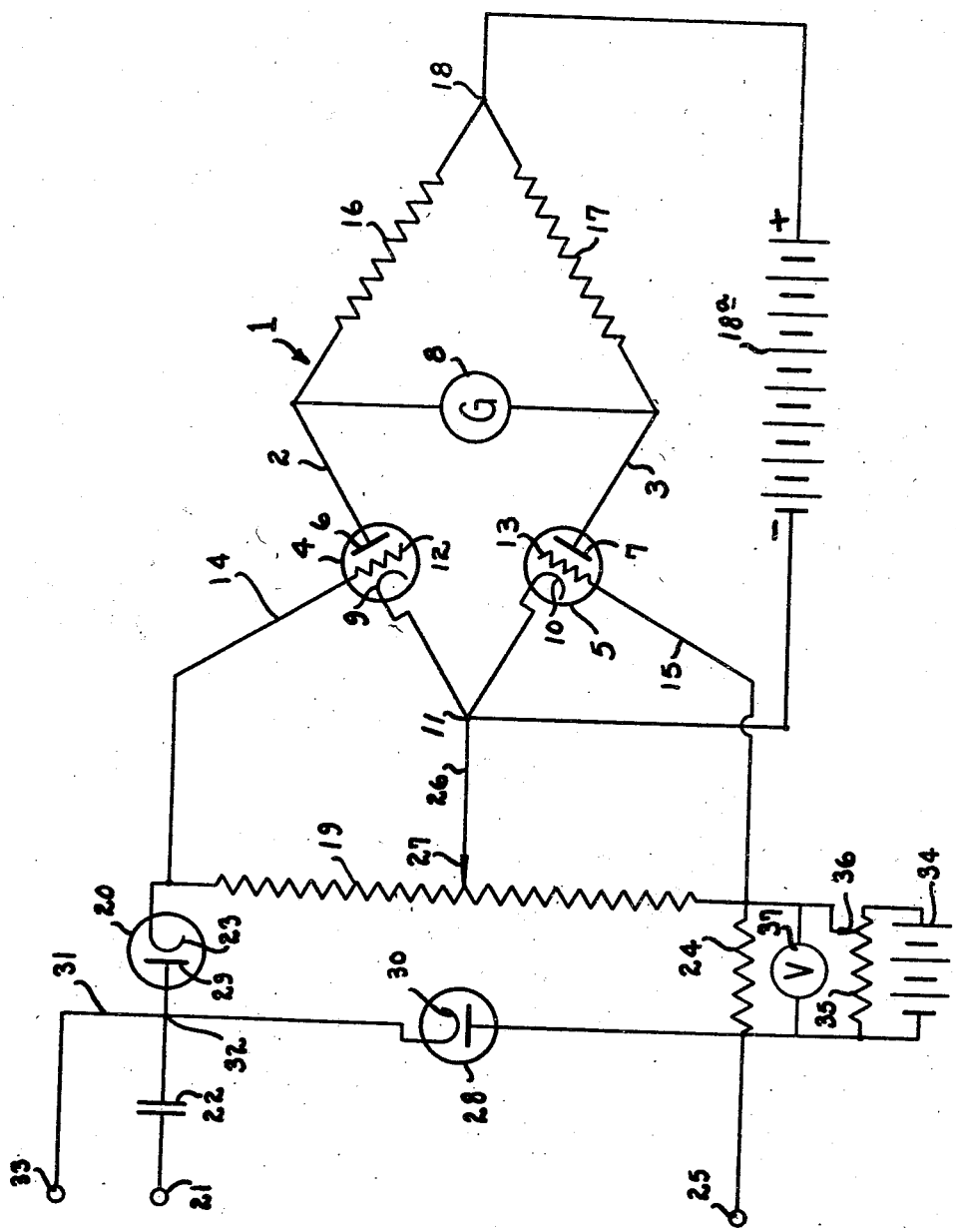

2,425,641

UNITED STATES PATENT OFFICE 2,425,641

VACUUM TUBE BRIDGE VOLTMETER

Jack Remde, Chicago, Ill., assignor to Ray L. Triplett, Bluffton, Ohio

Application August 14, 1943, Serial No. 498,630

2 Claims. (Cl. 171—95)

1

The present invention relates to electrical measuring apparatus, and more particularly to devices for measuring alternating and direct voltages.

In the industrial arts there has arisen a distinct need for devices or circuits which will accurately measure or compare voltages or currents of relatively small value and of a direct or alternating character. In the measurement of alternating voltage it has been customary to employ a meter having two small concentric coils connected in series through which the current is passed. A torque is developed between the coils, which causes the movable coil to turn and to inclose the maximum flux. The torque exerted between the coils will be proportional at every instant to the square of the instantaneous current. The average torque will be proportional to the average square of the instantaneous current or to the square of the effective or root-mean-square current.

By attaching a pointer to the moving coil and providing the instrument with a suitable graduated scale, it may be made to indicate effective current or voltage. When the current reverses through the coils the torque exerted between them will not reverse since the relative direction of the currents in the two coils will not change. It will be understood that as the current passes from a maximum value in one direction to a maximum value in the other the instantaneous values of current change but the relative positions of the two coils do not follow these changes in current values, due to the mechanical inertia or damping effects introduced into the instrument. Thus the pointer remains stationary to indicate a constant root-mean-square value notwithstanding the pulsatory character of the current passing through the coils of the instrument. It is apparent that the use of the damping or inertia-producing means serves to detract at least slightly from the accuracy of the instrument.

Accordingly, one of the objects of the present invention is to provide an improved voltmeter by which a measurement can be made without the use of damping elements or other frictional compensatory devices for maintaining the pointer in a stationary position when measuring alternating voltages. This object is attained, in brief, by providing a Wheatstone bridge having two adjacent legs formed of a pair of thermionic discharge devices. The alternating voltage is rectified and is applied across the grids of the two thermionic devices. The bridge is balanced by the application of a direct current potential of

2 equal magnitude and of opposite polarity to the rectified alternating potential, and also applied across the grids of the thermionic devices. The amount of direct current voltage necessary to neutralize or offset the effects of the rectified alternating voltage gives a measure of the alternating voltage.

Other objects and features will be apparent as the specification is perused in connection with the accompanying drawing, which shows in diagram form a circuit which constitutes the improved voltmeter.

Referring to the drawing, the numeral 1 designates in general an electrical bridge, the arms 2 and 3 respectively containing triodes 4, 5 of any suitable and well known type. The plates 6, 7 of the triodes are connected to the opposite corners of the bridge and joined together by a sensitive galvanometer 8. The filaments of cathodes 9, 10 of the triodes are also connected together at the point 11. Wires 14, 15 are connected to the electrostatic control elements 12, 13 respectively. The bridge is closed through a pair of adjacent resistors 16, 17, which are connected together at 18. A battery 18ª, poled in the manner indicated, is connected across the points 11 and 18 of the bridge.

There is a potentiometer 19 connected between the wires 14, 15 and therefore shunted across the grids 12, 13. A two-electrode rectifier 20, of any suitable and well known type, is connected between the upper end of the resistor 19 and the terminal 21 through a condenser 22. It will be noted that the rectifier is so poled that the filament 23 is connected to the resistor. There is a resistor 24 connected between the lower end of the resistor 19 and the terminal 25. A conductor 26 is connected between the terminal 11 of the bridge to an adjustable tap 27 on the resistor 19. There is a rectifier 28, similar to the rectifier 20, connected between the plate 29 of the rectifier 20 and the left-hand end of the resistor 24. The rectifier 28 is poled in such a way that the filament 30 thereof is connected to the plate 29. A conductor 31 is connected between a position 32 intermediate the condenser 22 and rectifier 20 to a terminal 33. There is a battery 34 shunted by a resistor 35 and connected at one end directly with the left-hand end of the resistor 24, the other end being connected to the opposite end of the resistor 24 through an adjustable tap 36. A voltmeter 37 is applied across the resistor 35.

Operation

For measuring voltages system as a whole be first calibrated. If it is desired to measure alternating voltages, a voltage of known root-mean-square value is applied across the terminals 21, 25. The positive half cycle of the alternating wave passes through the condenser 22, through the rectifier 20, thence through the resistors 19 and 24 in succession and back to the terminal 25. The drop in voltage across the resistor 19 causes the grid 12 of the triode 4 to be positive and the grid 13 of the triode 5 to become negative. Assuming that the bridge had been previously balanced by moving the adjustable tap 27, the effect of making the grid 12 positive and the grid 13 negative is greatly to unbalance the bridge, as will be indicated by the galvanometer 8. It will be understood that the effect of moving the adjustable tap 27 is to compensate for any differences in the internal impedances of the tubes 4, 5 and any differences in the values of the resistors 16, 17.

The manner in which the instantaneous charges on the grids 12 and 13 effect an unbalance of the bridge is due to the fact that the internal impedance of the tube 4 is decreased (positive grid) and the impedance of the tube 5 is increased (negative grid). It is apparent that by moving the adjustable tap 36 on the resistor 35 a potential drop of controllable character is produced in the resistor 24. This difference in potential is transmitted through the rectifiers 28 and 20 to the resistor 19, at which position it causes a potential difference across the last-mentioned resistor. It is also evident that the battery 34 and the electromotive force developed thereby are so poled as to apply a negative potential on the grid 12 and a positive potential on the grid 13, thus offsetting the unbalancing effects introduced by the potential applied at the terminals 21, 25. Obviously the tap 36 may be moved to such a position that the compensating or balancing potentials introduced by the battery 34 exactly balance, i. e., in an opposite sense the unbalancing potentials produced by the alternating voltage, so that the bridge may be returned to a balanced condition as will be indicated by the galvanomter 8. When the circuit has been properly calibrated the direct current voltage as indicated at 37 will be equal to the root-mean-square value of the alternating current applied to the terminals 21, 25.

It should be noted from the fact that the grids 12 and 13 are connected in their respective discharge tubes in adjacent legs of the bridge, the pulsatory character of the rectified half cycle of the measured voltage is, in effect, neutralized as the voltage on grid 12, for example, decreases. Following the voltage curve of the half cycle the voltage on the grid 13 changes in a compensating manner, due to the balancing effects introduced into the arms of the bridge. It is therefore feasible and practicable accurately to oppose the voltages applied to the respective grids, even though of a pulsatory character, by a potential of fixed value and provided at the resistor 24.

It is further apparent that due to the amplification factor on the tubes 4, 5, any slight difference in magnitude between the measured voltage applied to the grids 12, 13 and the voltage provided by the battery 34 is amplified, so that when the galvanometer 8 indicates a balanced condition of the bridge a balance is actually obtained between amplified replicas of the measured voltage and the balancing voltage, thus providing increased accuracy of measurement. A study of the circuit will show that the negative half cycle of the measured voltage finds a relatively low impedance path through the rectifier 28, and is thus effectively shunted from the bridge circuit. The bridge 1, therefore, measures and causes a balance to be obtained between one half cycle of the alternating voltage impressed on the terminals 21, 25 and the compensating or balancing voltage produced by the battery 34. In the event that direct current voltages are to be measured such voltage is applied between the terminals 33 and 25, thus eliminating the condenser 22.

The function of the condenser 22 when measuring alternately current potentials is to serve as a coupling device and to block any direct current impulses that may find their way to the terminal 21 from reaching the sensitive control electrode 12.

While the meter 37 would normally be calibrated to read R. M. S. values of the voltage being measured, as determined experimentally by testing with known voltages, the meter can obviously be calibrated in terms of peak voltage values found in the same manner.

From the foregoing, it is evident that I have disclosed an improved voltage measuring system which includes a bridge circuit and double unit rectifier serving to apply positive impulses to the grid of one of the electron discharge devices of the bridge and to apply negative impulses to the grid of the other electron discharge device of the bridge, the arrangement being such that these positive and negative impulses are effectively counterbalanced by direct current potentials set up at the battery 34 when the bridge is balanced.

It will be understood that I desire to comprehend within my invention such modifications as come within the scope of the claims and the invention.

Having thus fully described my invention, what I claim as new and desire to secure by Letters Patent is:

1. A circuit for measuring the voltage of alternating current potentials, said circuit comprising an electrical bridge having a pair of resistance arms, a pair of electron discharge devices respectively in the remaining pair of arms, each of said devices including a cathode, an electrostatic control member and a plate electrode, means for applying alternating voltage to be measured in rectified form across the control members for said devices, a null voltage indicator connected across said plate electrodes, means for biasing the control members by potentials equal and opposite to the potentials applied by the voltage to be measured whereby the bridge is balanced as determined by said null voltage indicator, and means for measuring the balance potentials to obtain a measurement of the voltage to be measured, said last-mentioned means comprising an electrical meter connected across said biasing means and separated from said null voltage indicator by said pair of electron discharge devices.

2. A circuit for measuring the voltage of alternating current potentials, said circuit comprising an electrical bridge having a pair of resistance arms connected together at one end, a pair of electron discharge devices respectively in the remaining pair of arms and connected to the other end of said resistances, a null voltage indicating device connected across opposite terminals of the bridge, each of said electron discharge devices including a cathode, an electrostatic control member and a plate electrode, a resistor connected across the control members of said devices, an adjustable tap from the resistor to each of the cathodes of said devices, a half wave rectifier connected to one end of said resistor and in series with the control member of one of said devices in order to apply the voltage to be measured to the device, a fixed resistance connected to the other end of the resistor to which the voltage to be measured is applied and in series with the control member of the other discharge device, a second rectifier connected between the first-mentioned rectifier and one end of said fixed resistor, means for applying a direct current balancing voltage to opposite ends of said fixed resistor by which to balance said electrical bridge and to cause said null voltage indicator to read zero, and an electrical measuring device connected across said fixed resistor for measuring the amount of biasing voltage necessary to effect a balanced condition of the bridge, said device being electrically separated from the null voltage indicator by each of said rectifiers and also by the resistor which is connected across the control members of the said electron discharge devices.

JACK REMDE.

REFERENCES CITED

The following references are of record in the file of this patent:

UNITED STATES PATENTS

| Number | Name | Date |
|---|---|---|
| 879,061 | Pierce | Feb. 11, 1908 |
| 1,232,879 | Wold | July 10, 1917 |
| 1,611,716 | Brown | Dec. 21, 1926 |
| 1,622,786 | Horle | Mar. 29, 1927 |
| 1,822,996 | Mirick | Sept. 15, 1931 |
| 2,143,219 | Wenger | Jan. 10, 1939 |
| 2,329,073 | Mitchel et al. | Sept. 7, 1943 |
| 1,254,620 | Newman | Jan. 22, 1918 |
| 2,198,226 | Peterson | Apr. 23, 1940 |

FOREIGN PATENTS

| Number | Country | Date |
|---|---|---|
| 232,593 | Great Britain | Dec. 10, 1925 |